F. H. SCHULTZ.
INSECT TRAP.
APPLICATION FILED NOV. 4, 1919.

1,367,100.

Patented Feb. 1, 1921.
2 SHEETS—SHEET 1.

INVENTOR
F. H. Schultz

WITNESS
J. Weber

By Osury & Bair ATTY'S.

F. H. SCHULTZ.
INSECT TRAP.
APPLICATION FILED NOV. 4, 1919.

1,367,100.

Patented Feb. 1, 1921.
2 SHEETS—SHEET 2.

WITNESS
J. Weber

INVENTOR
F. H. Schultz
By Orwig & Bair ATTY'S.

UNITED STATES PATENT OFFICE.

FERDINAND H. SCHULTZ, OF TREYNOR, IOWA.

INSECT-TRAP.

1,367,100.	Specification of Letters Patent.	Patented Feb. 1, 1921.

Application filed November 4, 1919. Serial No. 335,756.

*To all whom it may concern:*

Be it known that I, FERDINAND H. SCHULTZ, a citizen of the United States, and a resident of Treynor, in the county of Pottawattamie and State of Iowa, have invented a certain new and useful Insect-Trap, of which the following is a specification.

The object of my invention is to provide an insect trap of the type employing a rotating disk, preferably of transparent material, and a trap receptacle with mirrors arranged in certain relations to the disk and the trap for catching flies and other insects that may alight on the disk, on which bait may be provided.

With these and other objects in view, my invention consists in the construction, combination and arrangement of the various parts of the device, whereby the objects contemplated are attained, as hereinafter more fully set forth, pointed out in my claims, and illustrated in the accompanying drawings, in which:

Figure 1:
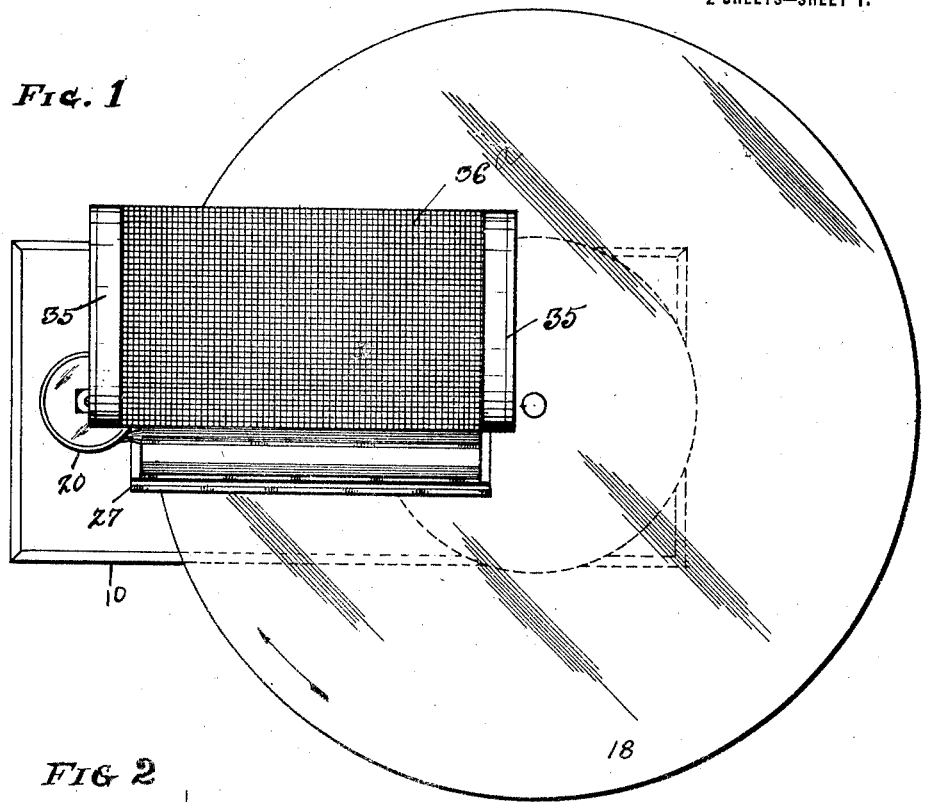
Figure 1 shows a top or plan view of an insect trap embodying my invention.
Figure 2:
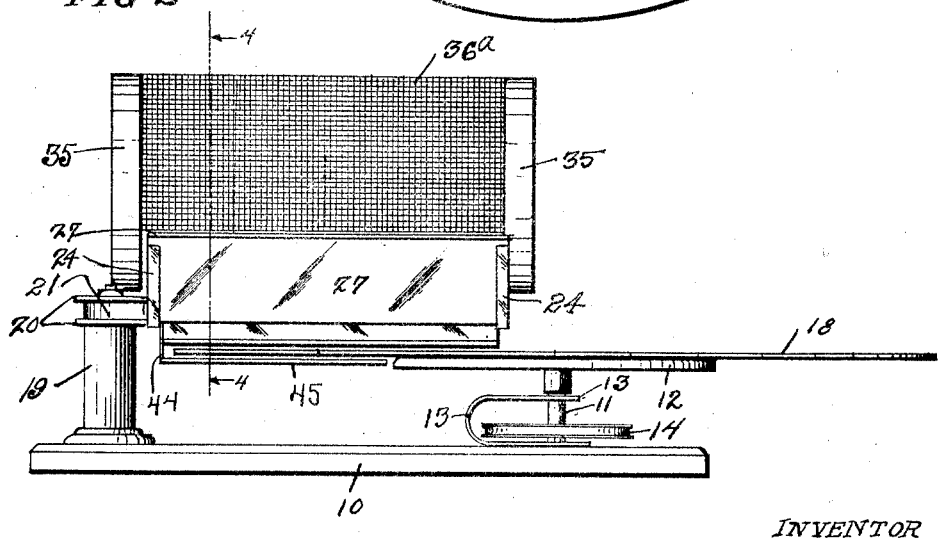
Fig. 2 shows a front elevation of the same.
Figure 10:
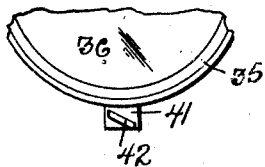
Fig. 10 shows a detail view of a portion of one end of the receptacle.

In the accompanying drawings, I have used the reference numeral 10 to indicate the base upon which the important parts of my improved trap are mounted.

Rotatably mounted on the base 10 is an upright shaft 11 on the upper end of which is a rotating table 12. Mounted on the base 10 and arranged with its upper arm supporting the shaft 11 is a U-shaped supporting bracket 13. Rotatably mounted on the shaft 11 between the arms of the bracket 13 is a pulley comprising the rim 14, the hub 15 and the spokes 16. The pulley is operatively connected with the shaft 11 by means of a convolute spring 17, the ends of which are connected with the pulley and the shaft respectively.

Resting on the rotatable table 12 is a relative large disk 18, which is preferably of ordinary transparent glass, and which may be readily and easily removed for cleaning and otherwise.

The shaft 11 is preferably arranged near one end of the base 10. At the other end of the said base is an upright post 19 having at its upper end, the spaced annular ribs 20. Mounted for rotation on the post 19 between the ribs 20 is a collar or the like 21, which supports the mirror and trap receptacle holding frame, which will now be described.

Figure 3:
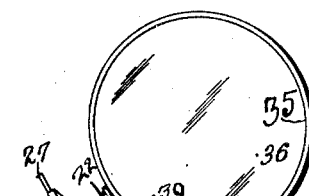
Fig. 3 shows an end elevation of the trap.
Figure 6:
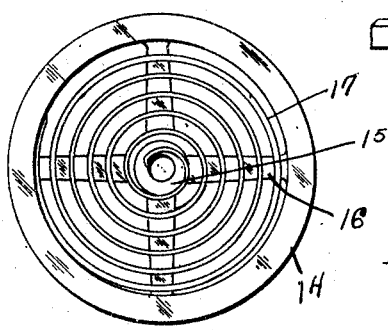
Fig. 6 shows a top or plan view of the spring connection between the operating pulley and the shaft for the rotating table.
Figure 7:
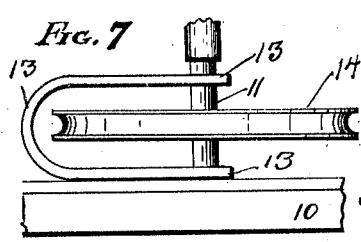
Fig. 7 shows a side elevation of the same.
Figure 4:
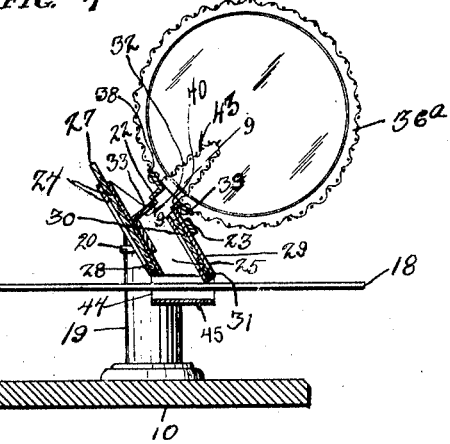
Fig. 4 shows a vertical, sectional view taken on the line 4—4 of Fig. 2.
Figure 8:
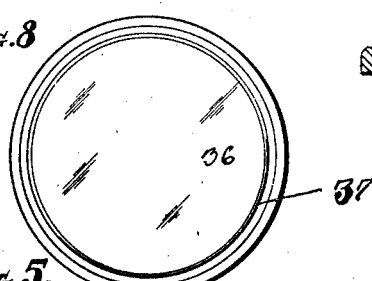
Fig. 8 shows an end elevation of the receptacle.
Figure 5:
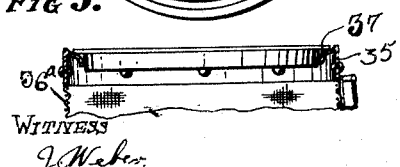
Fig. 5 shows a detailed sectional view of one end of the trap.

These parts will be described, as though they were extending over the disk 18. The frame under consideration has two spaced substantially horizontal strips 22 and 23, which are substantially parallel with each other and inclined from their lower edges upwardly and forwardly, as indicated in Fig. 4. These strips 23 and 22 are connected at their ends by end members 25 and 26, clearly shown in Figs. 3 and 4.

Formed at the ends of the frame just described adjacent to the strip 22 are opposite channel shaped guides 24, which open toward each other and are arranged to receive and hold a strip of mirror 27, which is thus held with its face inclined toward the disk 18, as clearly shown in Fig. 4.

At the lower ends of the guides 24 are stops 28, which support the mirror 27 and hold it with its lower edge spaced above the disk 18, such a distance as to permit the insect, particularly the house fly, to pass freely between the mirror 27 and the disk 18.

Spaced from the guides 24 and parallel therewith and adjacent to the frame member 23 are similar guides 29, which receive and support a narrower strip of mirror 30. Stops 31 limit the downward sliding movement of the mirror 30 in the guides 29, but are so located as to hold the mirror 30 quite close to the disk 18.

Located above the upper edge of the mirror 30 is a short shelf 32 formed on the inner surfaces of the ends 25 and 26 to support a strip 33 of ordinary transparent glass, which is tilted from its lower forward edge upwardly and rearwardly, as illustrated in Fig. 4.

The guides 29 extend upwardly above the upper edge of the mirror 30. In connection with the parts just described, I provide a receptacle comprising annular end members 35, spaced from each other and connected by a cylinder 36ª of reticulated material, such as ordinary screen wire.

The trap receptacle is provided at its ends with removable end members 36, having inwardly projecting flanges 37, which fit inside the annular members 35. Connecting the end annular members 35 are two strips 38 and 39. These strips have parallel outwardly extending flanges 40 and are connected by end members 41, which have on their outer surfaces ribs 42 designed to be received in the guides 29 for supporting the receptacle in position with the opening therein arranged, as shown in Fig. 4, adjacent to the upper edges of the glass 33 and the mirror 30.

Figure 9:
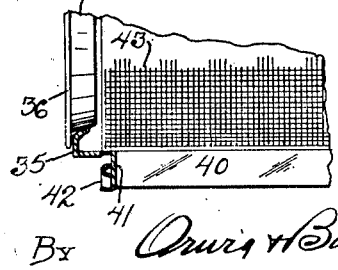
Fig. 9 shows a detailed, sectional view taken on the line 9—9 of Fig. 4.

The reticulated material forming the receptacle does not extend across the opening between the flanges 40, but is bent inwardly, as is illustrated at 43. At the inner portion of the part 43 is a comparatively narrow opening, which is preferably formed by cutting some of the circumferential strands or members of the screen and leaving others, and by removing some of the longitudinal wires, as illustrated in Fig. 9. Supported on the end 41 adjacent to the post 19 is a downwardly extending arm 44, on which is a strip 45 extending toward the turn-table 12 and terminating near said turn-table. This strip 45 is preferably of opaque material.

In the practical operation of my improved trap, after the parts have been installed in the manner and positions hereinbefore described and power is applied to the pulley 14, it will be seen that the disk 18 will be rotated. This rotation is very uniform on account of the action of the spring 17.

The flies which alight on the disk 18 are carried in the direction indicated by the arrow in Fig. 1 toward the mirrors 27 and 30. I have found that by using the mirror 27 and the mirror 30 as here indicated the lower edge of the mirror 27 will be invisible to the fly and the view of the two mirrors from the angle at which the fly will approach same will be a practically solid appearing mirror. This arrangement of mirror combination will camouflage the trap entrance to the extent that same will be invisible to the fly, thus allowing flies to be carried without fright past the mirror 27. When, however, the fly reaches the mirror 30 it cannot pass farther on the disk and it will naturally fly quickly upwardly.

Below the fly will be the dark surface of the opaque strip 45, while above the fly will be a light shining through the glass strip 33. The fly will tend to move upwardly to the glass and then will see light in the opening in the receptacle and will naturally tend to fly through the opening into the receptacle.

It will be noted that the receptacle can be swung around on the post 19 for convenience in removing the disk 18, and also that the ends of the receptacle can be quickly and readily removed for emptying the receptacle.

I find with the device as herein shown that when the proper power is placed on the disk 18, the flies will readily collect thereon and will not be frightened into moving into the trap until they get onto that part of the disk between the two mirrors, when they will fly upwardly and into the trap itself.

Some changes may be made in the construction and arrangement of the various parts of my improved device without departing from the essential features and purposes of my invention, and it is my intention to cover by my claims any modified forms of structure or use of mechanical equivalents, which may be reasonably included within their scope.

I claim as my invention:

1. An insect trap comprising a disk mounted for rotation, a frame above said disk, a pair of mirrors supported on said frame in parallel slanting position with one of said mirrors spaced above the disk and the other extending downwardly to a position close to the disk, a transparent member spaced substantially above the disk between said mirrors and a receptacle arranged with an opening adjacent to said transparent member.

2. In a device of the class described, a frame, a pair of substantially parallel mirrors supported thereon spaced from each other, a movable conveyer device arranged to travel beneath said mirrors, one of said mirrors being spaced above said conveyer and the other of said mirrors extending downwardly to a position close to the conveyer, a transparent member arranged between said mirrors and spaced above said conveyer, and a receptacle with an opening arranged adjacent to said transparent member and to the latter mirror.

3. A trap comprising a support, a frame thereon having end members, spaced substantially parallel mirrors mounted on said frame between said end members, a conveying device arranged to travel beneath said mirrors, one of said mirrors being spaced above said conveying device and the other extending downwardly close to said conveying device, a closure member between said mirrors spaced above said conveying device and arranged to permit the free passage of light therethrough, and a receptacle arranged with its opening in position to receive insects flying upwardly between said last described member and the latter mirror.

4. A trap comprising a support, a frame thereon having end members, spaced substantially parallel mirrors mounted on said frame between said end members, a conveying device arranged to travel beneath said mirrors, one of said mirrors being spaced above said conveying device and the other extending downwardly close to said conveying device, a closure member between said mirrors spaced above said conveying device and arranged to permit the free passage of light therethrough, and a receptacle arranged with its opening in position to receive insects flying upwardly between said last described member and the latter mirror, the conveying device comprising a shaft, a disk mounted thereon and means for imparting rotation to said shaft, said means including a loosely mounted pulley and a spring for connecting said pulley with said shaft.

5. A trap comprising a support, a frame thereon having end members, spaced substantially parallel mirrors mounted on said frame between said end members, a conveying device arranged to travel beneath said mirrors, one of said mirrors being spaced above said conveying device and the other extending downwardly close to said conveying device, a closure member between said mirrors spaced above said conveying device and arranged to permit free passage of light therethrough, and a receptacle arranged with its opening in position to receive insects flying upwardly between said last described member and the latter mirror, said receptacle comprising a cylinder of reticulated material having removable end members.

6. A trap comprising a support, a frame thereon having end members, spaced substantially parallel mirrors mounted on said frame between said end members, a conveying device arranged to travel beneath said mirrors, one of said mirrors being spaced above said conveying device and the other extending downwardly close to said conveying device, a closure member between said mirrors spaced above said conveying device and arranged to permit the free passage of light therethrough, and a receptacle arranged with its opening in position to receive insects flying upwardly between said last described member and the latter mirror, said receptacle comprising a cylinder of reticulated material having an opening and having said reticulated material extending inwardly from said opening and provided with an opening at its inner portion.

7. A trap comprising a support, a frame thereon having end members, spaced substantially parallel mirrors mounted on said frame between said end members, a conveying device arranged to travel beneath said mirrors, one of said mirrors being spaced above said conveying device and the other extending downwardly close to said conveying device, a closure member between said mirrors spaced above said conveying device and arranged to permit the free passage of light therethrough, and a receptacle arranged with its opening in position to receive insects flying upwardly between said last described member and the latter mirror, said receptacle comprising a screen wire cylinder having an opening in its wall, having the screen material extended inwardly from said opening and provided with an opening in its inner portion formed by removing some of the longitudinal wires and cutting some of the circumferential wires for leaving points projecting into the receptacle.

8. A trap comprising a support, a frame thereon having end members, spaced substantially parallel mirrors mounted on said frame between said end members, a conveying device arranged to travel beneath said mirrors, one of said mirrors being spaced above said conveying device and the other extending downwardly close to said conveying device, a closure member between said mirrors spaced above said conveying device and arranged to permit the free passage of light therethrough, and a receptacle arranged with its opening in position to receive insects flying upwardly between said last described member and the latter mirror, said frame being mounted for swinging movement.

9. In a trap, a supporting device on which insects may alight, a frame device, one of said devices being mounted for movement relative to the other, a pair of parallel inclined mirrors on said frame device above said supporting device, one spaced from the supporting device to allow insects on the device to pass thereunder, and the other being arranged close to said device, a transparent member arranged between said mirrors and spaced above said conveyer, and a receptacle with an opening arranged adjacent to said transparent member and to the latter mirror.

Des Moines, Iowa, October 17, 1919.

FERDINAND H. SCHULTZ.